US000001132H

United States Statutory Invention Registration [19]

[11] Reg. Number: H1132

Hellyar et al.

[43] Published: Jan. 5, 1993

[54] PARTICLE TRACKING TECHNIQUE FOR STUDYING FLUID FLOW IN INDUSTRIAL VESSELS

[75] Inventors: Kenneth G. Hellyar; Rajendrakumar V. Mehta, both of Rochester, N.Y.

[73] Assignee: Eastman Kodak Company, Rochester, N.Y.

[21] Appl. No.: 831,718

[22] Filed: Feb. 5, 1992

[51] Int. Cl.[5] ..... G01S 3/80; G01F 1/66

[52] U.S. Cl. ..... 367/128; 367/98; 367/117; 340/603; 340/606; 73/861.18; 73/861.25; 73/861.27

[56] References Cited

U.S. PATENT DOCUMENTS

| | | | |
|---|---|---|---|
| 3,205,475 | 9/1965 | Foss | 367/117 |
| 3,792,424 | 2/1974 | Nakatsuji et al. | 367/117 |
| 3,988,922 | 11/1976 | Clark et al. | 73/637 |
| 4,641,526 | 2/1987 | Izumi et al. | 73/572 |
| 4,813,025 | 3/1989 | Rowland et al. | 367/6 |
| 4,862.152 | 8/1989 | Milner | 340/712 |

OTHER PUBLICATIONS

Garbini et al., "Measurement Of Fluid Turbulence Based On Pulsed Techniques, Part 1, Analysis", J. Fluid Mech, 1982, vol. 118, pp. 445–470.

Garbini et al., "Measurement Of Fluid Turbulence Based On Pulsed Ultrasound Techniques, Part 2, Experimental Investigation", J. Fluid Mech, 1982, vol. 118, pp. 471–505.

Scofield et al., "Mixing Time Distributions And Period Doubling in Stirred Tanks", pp. 1–22, presented at Nov. 1990 Annual Mtg. of the American Institute of Chemical Engineers.

Barneveld et al., "Measuring The Liquid Circulation Time In a Large Gas–Liquid Contactor By Means Of A Radio Pill. 1. Flow Pattern And Mean Circulation Time", Ind. Eng. Chem. Res. 1987 vol. 26, pp. 2185–2192.

Middleton, "Measurement Of Circulation Within Large Mixing Vessels", Third European Conference On Mixing, Apr. 4–6, 1979, paper A2.

Mukataka et al., "Effects Of Vessel Size And Rheological Properties Of Suspensions On The Distribution Of Circulation Times In Stirred Vessels", J. Ferment. Technol. vol. 58, No. 2, pp. 155–161, 1980.

Gavlak et al., "Circulation Time Distribution In a Turbine–Stirred Tank", presented at Mixing XII, Engineering Foundation Conference, 1989.

*Primary Examiner*—Bernarr E. Gregory

*Attorney, Agent, or Firm*—Foley & Lardner

[57] ABSTRACT

An apparatus and method for determining the position of an object, especially the position of a movable object in an industrial vessel. The position is determined by the use of two signals having a very large difference in their velocities, such as electromagnetic and acoustic waves. The object whose position is to be determined receives the electromagnetic signal, analyzes the electromagnetic signal, and, if appropriate, transmits an acoustic signal. In addition to the object containing an electromagnetic receiver and an acoustic transmitter, there is required an electromagnetic transmitter, three or more receivers to receive the acoustic signal from the object, and supporting equipment to process signals and log data. When the object transmits an acoustic signal, the acoustic receivers, which are in known positions in the vessel, receive the signal at different times depending on the distance of the object from each receiver. From the speed of the acoustic signal in the medium contained in the vessel and the time required for the signal to reach each receiver, the distances from each receiver to the object are calculated. Because the location of each receiver is known, it is possible by triangulation to calculate the position of the object.

20 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PARTICLE TRACKING TECHNIQUE FOR STUDYING FLUID FLOW IN INDUSTRIAL VESSELS

BACKGROUND OF THE INVENTION

1. Field of the Invention

This invention relates in general to a method and apparatus for tracking a particle and in particular to a method and apparatus for tracking a particle in order to analyze fluid flow in industrial vessels.

2. Background Information

There are many industrial processes (for example, in the chemical industry), in which a solid or fluid is added to a fluid in a vessel. The contents of the vessel may be mixed either during or after the addition. It is often desirable that the resulting mixture be uniform or homogeneous. The quality of mixing can have a profound influence on the quality of the resulting product. In industrial vessels, mixing equipment acts upon the large scale fluid convection patterns, resulting in 'macromixing'. However, the fluid flow is a complex three-dimensional and time-dependent phenomenon. Experimental characterization of such flows has long been considered a difficult challenge. One class of methods for analyzing these large scale fluid patterns, and the mixing process, involves the addition of a 'tracer' that can be tracked as it moves under the influence of fluid forces.

Methods that employ more than one particle frequently use particles ranging in size from approximately a micrometer or less to several millimeters and consisting of insoluble solids, liquids, or gases. These methods usually require optical methods, such as photography, to observe the motion of the particles. Optical methods are difficult to use in opaque vessels or processes that require the absence of light. If the fluid contains other suspended particles, or is opaque, then methods based on the optical detection of many particles are not practical. It is also difficult to follow a single particle, as it moves through the vessel, over an extended period of time.

A second class of methods for analyzing fluid flow and mixing processes uses a single tracer particle, which is tracked over an extended period of time. The tracer particle can be either 'active' or 'passive'. An example of a passive tracer particle is given in a paper by D. F. Scofield and C. J. Martin titled "Mixing Time Distributions and Period Doubling in Stirred Tanks" presented at the 1990 Annual Meeting of the American Institute of Chemical Engineers (Chicago, November 1990). They described a system for measuring the "time-dependent mixing in a common 284 liter (75 gallon) industrial mixer . . . using a Lagrangian Marker Particle (LMP) method". Their tracer particle was a one centimeter diameter, neutrally buoyant sphere, in a transparent tank. They used video equipment to capture electronic images of the particle, from which the particle position could be computed. The particle could be tracked for hours. By inferring the convective flow field from the trajectory of the particle, they were able to determine "the time dependent structure of the flow". The method requires that the particle be illuminated. Although most of the hardware is commercially available, the method uses computationally intensive image analysis methods. The method described by Scofield and Martin is an example of an optical imaging technique. If the imaging signal has frequencies in the radio frequency range, it is a method similar to radar. If the imaging signal is an acoustic wave (compressive wave), then it is a method similar to sonar. In all of these methods, the tracer particle is a passive object that reflects an incident signal to one or more detectors.

The use of a more complex active particle can minimize the complexity of the detection equipment. Jan van Barneveld, Willem Smit, Nico M. G. Oosterhuis, and Hans J. Pragt in an article titled "Measuring the Liquid Circulation Time in a Large Gas-Liquid Contactor by Means of a Radio Pill. 1. Flow Pattern and Mean Circulation Time" (Industrial and Engineering Chemistry Research, Volume 26, pages 2185 to 2192, November 1987) describe a neutrally buoyant "pill" three centimeters in diameter. The tracer particle emits a radio frequency signal of approximately 1 MHz. Aerials are mounted inside the vessel in the vicinity of the mixing impeller. As the particle passes through the opening in the aerial, its signal is detected and logged. J. C. Middleton has described a similar system, in "Measurement of circulation Within Large Mixing Vessels", Third European Conference on Mixing, Apr. 4 to 6, 1979, paper A2.

Instead of using a tracer particle containing a radio frequency source, one could use a particle containing a magnet, and detect its passage through an aerial by the induced electromagnetic signal. The elapsed time between repeated passages of the particle through the aerial are used in the calculations of a Circulation Time Distribution, which in turn is a measure of the macromixing in the vessel. These methods, whether using a radio transmitter or a magnetic particle, are limited to the detection of a particle as it passes through a plane surface defined by the aerial. The presence of the aerial may influence the flow field. If the detectors were capable of determining direction, then three or more detectors could be used to determine the position of a particle transmitting a signal. Many range finding and navigation systems use these principles.

A system of tracking in which the tracer particle contains an acoustic transmitter, but no receiver, is possible. If the signal consists of a series of pulses, the transmission rate can be synchronized with a clock in the signal processing equipment. From this, the initial time of the pulse transmission is known, and the position of the tracer particle can be determined by triangulation. In this system, it is necessary that the transmitter clock on the particle and the clocks on the detectors remain synchronized. Such a system for determining the position of a torpedo is described in U.S. Pat. No. 3,205,475 issued to Rene N. Foss. The present invention is superior in the sense that this synchronization is not necessary.

SUMMARY OF THE INVENTION

This invention relates to an apparatus and a method for determining the location of an object by the use of two signals having a very large difference between their velocities of propagation, such as the difference between electromagnetic and acoustic waves (where 'acoustic' is taken to mean any compressive wave transmitted through a material media; examples include, but are not limited to, sound waves, shock waves, and elastic waves). The ratio of the velocities of the two signals is one factor in determining the positional resolution of the system; the greater the ratio, the better the positional resolution. The ratio of the higher velocity to the lower velocity should be at least about 10. In the preferred embodiment, the ratio is about $10^5$.

The object whose position is to be determined must have a means of receiving an electromagnetic signal, analyzing the signal so as to perform a function, and upon recognizing the appropriate instruction, transmitting an acoustic signal. The object may be a 'tracer' or 'marker' particle.

In addition to the object containing a receiver for electromagnetic signals and a transmitter for acoustic signals, there must be: a transmitter which sends a signal capable of being received by the object, three or more receivers capable of detecting an acoustic signal transmitted by the object, and supporting equipment to process signals and log data. In the present invention, this method is used to determine the position of a tracer or marker particle in a fluid in a vessel, with the purpose of inferring the macroscopic fluid flow patterns from the position of the particle The method of the invention involves the use of an active tracer particle. The particle contains a device to receive electromagnetic signals, and responsive to it, another device to transmit acoustic signals. The particle is instructed to transmit an acoustic signal by the sending of an electromagnetic signal to the particle from an external transmitter. At least three detectors are used to receive the acoustic signals. From the elapsed times (the times at which the detectors receive acoustic signals minus the time at which the particle transmits the signal) and the velocity of propagation of the acoustic signal in the fluid medium, three or more distances can be computed. These distances are used in calculations to triangulate and determine the particle position relative to the detectors.

This invention makes use of the fact that the velocities of propagation of electromagnetic and acoustic signals differ greatly, that is, the ratio of the higher velocity to the lower velocity is on the order of $10^5$. In other words, the velocity of the electromagnetic signal is very much greater than that of the acoustic signal.

In order to accurately calculate the elapsed times, it is necessary to know the time at which the tracer particle emits the acoustic signal. Because the particle is triggered using an electromagnetic signal, the error in the initial time is very small, regardless of the particle position within the vessel. If the triggering signal and detection signal propagate at the same velocity, the calculated position of the particle would have an uncertainty on the order of the largest dimension of the vessel, and would be of little practical utility. Also, both the triggering and detecting signals must propagate through the medium. For example, acoustic waves do not propagate through a vacuum. Therefore, the system described in this invention would not be practical in a vacuum. The velocity of propagation of waves is often dependent upon the frequency of the wave (dispersion). However, the differences in wave propagation velocities are much smaller than the velocity differences between electromagnetic and acoustic waves. Therefore, the preferred method is to use two different modes of wave propaqation, though, in principle, a single mode of propagation where the velocity of propagation may be varied (as by frequency) would also work.

This invention advances the art of determining the position of an object by describing a method and apparatus for locating the object in three dimensional space, when the object is free to move under the influence of fluid forces, when the object has a characteristic length (for example, diameter) on the order of one to three centimeters, and when the object cannot be observed by optical means because the vessel is opaque, the fluid is opaque, or the use of optical illumination would produce undesired effects.

The present invention has other advantages when compared to the existing art, such as the following. The system of tracer particle and associated equipment (transmitter, hydrophones, and computer) is less complex than systems using image processing technology or complex electronic detectors. Because the tracer particle is a self-contained unit communicating by electromagnetic and acoustic signals, it is free to move under the influence of fluid forces, without the restriction of connecting wires, cables, cords, and so forth.

Although the particular embodiment is intended for studying the motion of fluids in vessels, the method disclosed herein is suitable for the detection of any object capable of containing a device that receives signals propagated at one velocity, and containing a device to transmit signals at a lower velocity. Moreover, although one embodiment of the invention includes an industrial mixing vessel, other embodiments may include a pipeline. For example, it is believed that the invention could be used to identify the location of a leak in a pipeline.

DETAILED DESCRIPTION OF THE PREFERRED EMBODIMENTS

Figure 1:
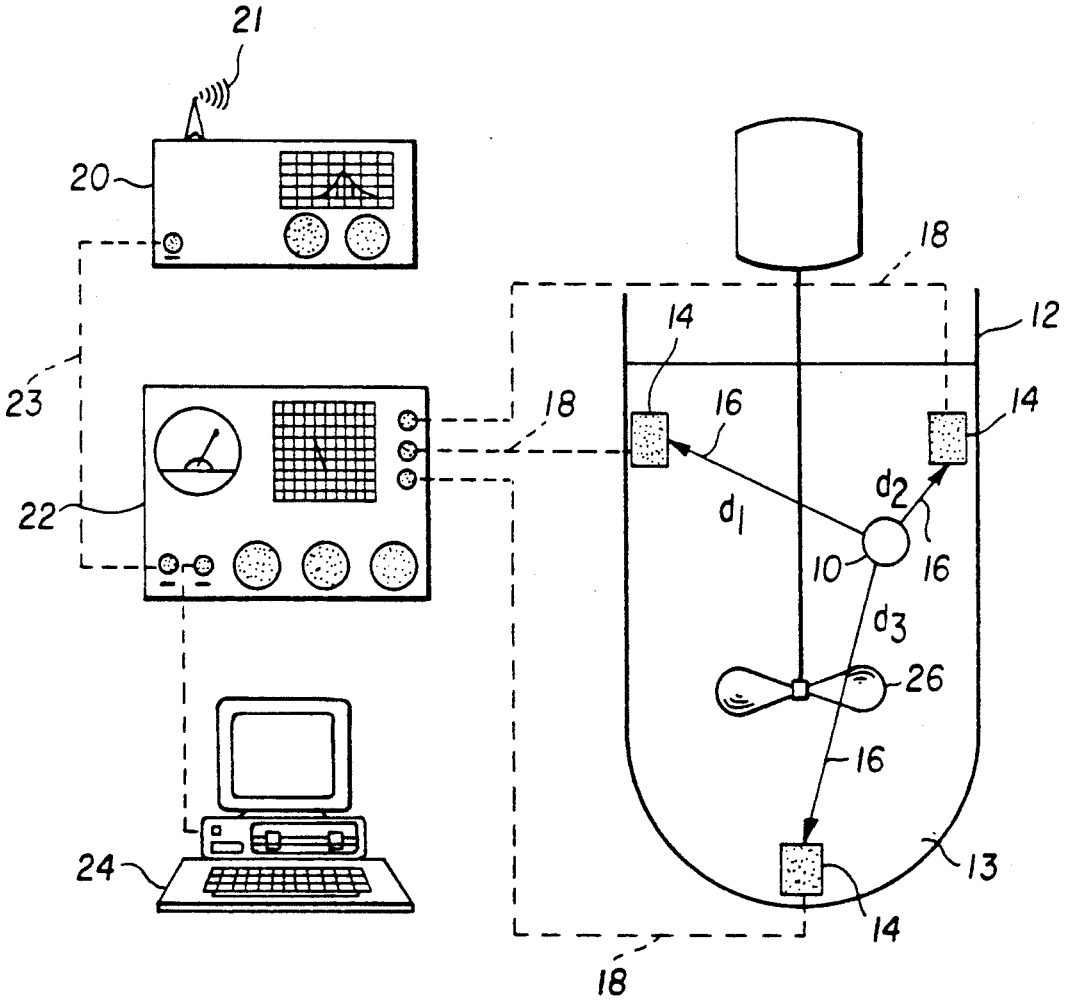
FIG. 1 is a schematic view of the overall arrangement of the apparatus of the invention.

FIG. 1 is an illustration of one embodiment of the present invention. A neutrally buoyant marker particle 10 would contain a transceiver including a receiver for the detection of electromagnetic signals 21 and a transmitter for sending acoustic signals 16. Preferably, the transceiver is less than an inch in diameter. The vessel 12 is equipped with three or more acoustic detectors or transducers 14. The detectors 14 may be hydrophones or some other detector, such as a microphone mounted on the side of the vessel 12 in such a manner that it responds to an acoustic signal 16 traveling through the fluid 13 and not along the vessel wall. The detectors 14 communicate with a signal processor 22, preferably through shielded cables 18, although other methods are possible.

There is a transmitter 20 which sends an electromagnetic signal 21 to the marker particle 10. The transmitter 20 also communicates with the signal processor 22, either through a cable 23 in the same manner as the detectors 14, or in some other manner. The signal processor 22 is connected to a computer 24 or other control device that controls the signal processor 22 and the transmitter 20, and performs data processing functions (such as logging data).

In operation, the computer 24 would determine a time from an internal clock, to be known as the initial time, $t_0$. At this time a message would be sent to the transmitter 20 instructing the transmitter 20 to send an electromagnetic signal 21 to the marker particle 10. Upon receiving the electromagnetic signal 21, the marker particle 10 transmits an acoustic signal 16. The three detectors 14 receive the signals 16 at times proportional to the distances $d_1$, $d_2$, and $d_3$ between the detectors 14 and the particle 10. The detectors 14 then transmit a signal to the signal processor 22. The elapsed time between the transmission of the electromagnetic signal 21 and the detection of the acoustic signal 16 is calculated by the signal processor 22. The three elapsed times are sent to the computer 24, where they are saved for future calculations. Distances $d_1$, $d_2$, and $d_3$ are calculated from the elapsed times and the velocity of the acoustic signal 16 in the fluid 13. The computer 24 then uses these distances and calculates, by triangulation, the position of the particle 10 relative to the detectors 14. Since the position of the detectors 14 is known relative to the vessel 12, the position of the marker particle 10 relative to the vessel 12 can be calculated.

To better understand the significance of using signals propagated at two different velocities, consider the velocity of propagation of electromagnetic radiation in water, which is on the order of $2.25\times10^8$ m/s, and the velocity of sound in water, which is on the order of $1.5\times10^3$ m/s. If the particle 10 is known to be within a vessel 12 with a characteristic dimension of 1 meter, then the uncettainty in the initial time at which the particle 10 receives the electromagnetic signal 21 is (1 m)/($2.25\times10^8$ m/s) or about 4 nanoseconds. The time for the acoustic signal 16 to travel from the particle 10 to a detector 14 located at a distance of 1 meter is (1 m)/($1.5\times10^3$ m/s) or about $\frac{2}{3}$ millisecond. Therefore, the uncertainty in the initial time is on the order of one millionth of the time for the acoustic signal 16 to be sent. This error is negligible in comparison with the other experimental uncertainties.

Similarly, the amount of time elapsed between detection of the acoustic signal 16 by the detectors 14 and receipt of a third signal from the detectors 14 by the signal processor 22 must be negligible in comparison with the elapsed time for the acoustic signal to travel from the marker particle to the acoustic detector. Alternatively, by placing an acoustic source near the acoustic detector and measuring the elapsed time for the signal to be transmitted from the acoustic detector to the signal processor, one can determine a calibration factor for use in the calculations, thus compensating for transmission lag in the detection system.

The detection or third signal is preferably transmitted from the detectors 14 to the signal processor 22 through shielded cables 18. The speed of the detection or third signal through the shielded cables 18 is on the same order of magnitude as the velocity of propagation of electromagnetic radiation, as discussed above. Therefore, the time of detection of the acoustic signal 16 by the detectors 14 is deemed to be the same as the time of receipt of the third signal from the detectors 14 by the signal processor 22.

Sound can be used either in a continuous wave mode or in pulse mode. In the preferred embodiment of this invention, the acoustic signals 16 are transmitted in pulse mode. The detectors 14 then operate as digital detectors, sensing the presence or absence of a signal. The particle 10 does not need to transmit the acoustic signal 16 isotropically. Furthermore, attenuation of the signal 16 before being detected has little effect on the calculated distance. Continuous acoustic waves may contain additional information not available in pulse mode. For example, when a moving particle transmits an acoustic signal, the frequency is altered according to the Doppler effect. Suitably sophisticated detectors could process the signal and infer information about the velocity field in the locality of the marker particle. Examples of this technique, where the 'particle' is usually a volume element somewhat smaller than the marker particle 10 in the invention disclosed here, have been reported in the literature (Joseph L. Garbini, Fred K. Forster and Jense E. Jorgensen, "Measurement of Fluid Turbulence Based on Pulsed Ultrasound Techniques." Parts 1 and 2, Journal of Fluid Mechanics, volume 118, 1982, pages 445 to 505).

In one preferred embodiment, the tracer particle 10 emits an acoustic signal 16 as a pulse each time it is activated by an electromagnetic signal 21. The ability to vary the acoustic pulse rate by changing the activation rate makes it possible to select acoustic rates that minimize problems of detection caused by background interference. Also, it is possible to make use of variable pulse rates and 'boxcar' type filters to select acoustic signals arriving only within a specified timing window. Because of viscous drag, the particle velocity is much less than the velocity of sound. Therefore, within some arbitrarily small time interval, the particle 10 can move a distance that can be calculated. The time interval corresponding to this positional interval can be calculated, and the detection equipment arranged to accept signals arriving only within that time 'window', rejecting all other signals.

To make this clearer, consider a tracer particle 10 that is 1 meter from one of the detectors 14. At an acoustic signal speed of $1.5\times10^3$ m/s, the detector 14 should detect a signal 0.67 milliseconds after the particle 10 has transmitted the signal 16. From experimental observations, one might find that the tracer particle 10 has a velocity that never exceeds 10 m/s. If the particle 10 is activated every 10 milliseconds, then the particle can travel 0.1 meter in this time interval, and is between 0.9 and 1.1 meters from the detector 14. Therefore, the detector 14 should accept a signal 16 arriving in the time window from 0.603 to 0.737 (0.67 $\pm$0.067) millisecond after the particle 10 has transmitted the acoustic signal 16. All other signals (for example, reflections) during the 10 millisecond interval between repeated pulses would be considered extraneous and would be rejected.

In one preferred embodiment of this invention, the marker particle 10 could be powered by a small battery such as those used in watches, calculators, and hearing aids. Alternatively, the particle 10 could derive the energy for the acoustic signal 16 from the electromagnetic signal 21. Because the electromagnetic signal 21 need not propagate over distances of more than several meters, one could transmit signals 21 with energies on the order of tens of watts, and the signals 21 could provide sufficient power for the acoustic signal 16. When implemented in this manner, the particle 10 needs no additional source of power and could operate for time periods independent of power considerations.

In a vessel 12 containing an impeller 26, sensor probes, and baffles, it is expected that the path between the particle 10 and a detector 14 would occasionally become obstructed. One way to overcome the problem of obstructions is to have more than the minimum of three detectors 14, and use the redundant detectors to compensate for obstructed detectors. The other possibility is to mathematically smooth a curve through several unobstructed positions to calculate the position at which a detector 14 is unable to locate the particle 10.

Waves passing through a material medium are attenuated due to interactions between the wave and the medium by which energy is dissipated in forms other than by signal propagation. The absorption behavior of electromagnetic waves in pure liquid water at normal temperature and pressure is complex (J. D. Jackson, *Classical Electrodynamics,* 2nd ed., New York: John Wiley & Sons, 1975, p. 290ff). However, the absorption coefficient at frequencies below $10^8$ Hz is extremely small, and little attenuation is expected. For example, the absorption coefficient at $10^6$ Hz is approximately $10^{-4}$ cm$^{-1}$. The Beer-Lambert Law, where the absorption is due to the liquid, is $$I_f = I_i e^{\alpha l}$$

Where $I_i$ is the intensity of the incident radiation, $I_f$ is the intensity of the final radiation (at position l), l is the path length of the radiation, e is the exponential constant, and $\alpha$ is the absorption coefficient. For a path length of 10 meters, the final intensity is 90% of the initial intensity. The attenuation in sea water is larger than in pure water. Jackson (op. cit., p. 292) gives the following expression, $$\alpha(\text{cm}^{-1}) = 8.4 \times 10^{-5} \sqrt{\nu\,(\text{Hz})}$$

Where $\nu$ is the frequency in cycles/second. At $10^6$ Hz the absorption coefficient is 0.27 cm$^{-1}$. The attenuation of electromagnetic signals in sea water is a well-known problem, restricting communications to submerged submarines. However, the path lengths in industrial mixers are generally on the order of a few meters, and, for water, the absorption is not prohibitive. Barneveld, et al. have shown that it is possible to transmit a 1 MHz signal from a "radio pill" in water to a receiver, where the circuitry in the "pill" uses about 7 $\mu$W of power. In the present invention, an electromagnetic signal 21 is being transmitted to the particle 10, where the external transmitter 20 has fewer power constraints.

The absorption coefficient of sound in water at 20° C. is given by the following formula, $$\alpha(\text{cm}^{-1}) = 2.5 \times 10^{-16} \nu^2$$

For an acoustic signal of frequency $10^6$ Hz, as used in one embodiment of the invention, the absorption coefficient is $2.5 \times 10^{-4}$ cm$^{-1}$ (R. Bruce Lindsay and Robert T. Beyer, 'Acoustics' in *A Physicist's Desk Reference,* The Second Edition of Physics Vade Mecum, New York: American Institute of Physics, 1989, page 57). Therefore, the attenuation losses for the acoustic signal are very small. The selection of the electromagnetic frequency is based primarily upon considerations of attenuation. However, for the acoustic signal, an ultrasonic source is selected for operational convenience and freedom from interference from process noise. For the 1 MHz signal considered here, the wavelength is about 1.5 millimeters. Ultrasonic frequencies much higher than 1 MHz are also possible.

As already described, the neutrally buoyant tracer particle 10 contains a radio-frequency receiver and an acoustic transmitter. This is in effect a miniaturized radio. The manufacture of miniaturized radios is known to those practiced in the art of miniaturized electronic devices. For example, miniature radios can be incorporated into eyeglass frames, and other consumer products.

It will be appreciated that the present invention can be embodied in other specific forms without departing from the spirit or essential characteristics thereof. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An apparatus for locating a position of a movable object within a coordinate system comprising:

(a) a first transmitting means for transmitting an electromagnetic signal at a first velocity;

(b) a transceiver element for receiving the electromagnetic signal, analyzing the electromagnetic signal, and transmitting an acoustic signal at a second velocity in response to the electromagnetic signal;

(c) a transducer for receiving the acoustic signal and for generating a third signal in response to receiving the acoustic signal;

(d) a signal processor for receiving the third signal and calculating the elapsed time between the transmission of the electromagnetic signal and the receipt of the acoustic signal; and (e) a control device for controlling the first transmitting means and the signal processor, and for generating information from which the position of the object can be determined.

2. An apparatus according to claim 1, wherein the first velocity is very much greater than the second velocity.

3. An apparatus according to claim 1, including a plurality of transducers for receiving the acoustic signal, wherein each transducer generates a respective third signal.

4. An apparatus according to claim 1, wherein the acoustic signal is transmitted in a pulse mode.

5. An apparatus according to claim 1, wherein the movable object is disposed in a fluid in a vessel, in order to infer macroscopic fluid flow patterns from the sequential positions of the movable object.

6. An apparatus according to claim 5, wherein the movable object is free to move under the influence of fluid forces.

7. An apparatus according to claim 5, wherein one of the vessel and fluid is opaque.

8. An apparatus according to claim 5, wherein a process taking place in the vessel requires the absence of light.

9. An apparatus according to claim 1, wherein the movable object has a characteristic length on the order of one to three centimeters.

10. An apparatus accord to claim 1, wherein the acoustic signal has a frequency of about $10^6$ hertz.

11. A method of obtaining information from which a location of a movable object in a coordinate system can be determined comprising:

(a) transmitting an electromagnetic signal with a first transmitting means at a first velocity;

(b) receiving the electromagnetic signal with a transceiver, analyzing the electromagnetic signal, and transmitting an acoustic signal at a second velocity in response to the electromagnetic signal;

(c) receiving the acoustic signal with a transducer and generating a third signal in response to the acoustic signal;

(d) receiving the third signal with a signal processor and calculating the elapsed time between the transmission of the electromagnetic signal and the receipt of the acoustic signal; and (e) controlling the first transmitting means and the signal processor with a control device, and generating information from which the position of the object can be determined.

12. A method as claimed in claim 11, further comprising an initial step of placing the transceiver on the movable object.

13. A method as claimed in claim 12, wherein the initial step of placing the transceiver on the movable object includes the step of placing the movable object in a fluid in a vessel, in order to infer macroscopic fluid flow patterns from the sequential positions of the movable object.

14. A method as claimed in claim 13, wherein the step of placing the movable object in a fluid in a vessel includes the step of placing the movable object in a fluid in a vessel wherein the movable object is free to move under the influence of fluid forces.

15. A method as claimed in claim 13, wherein the step of placing the movable object in a fluid in a vessel includes the step of placing the movable object in a fluid in a vessel wherein one of the vessel and fluid is opaque.

16. A method as claimed in claim 13, wherein the step of placing the movable object in a fluid in a vessel includes the step of placing the movable object in a fluid in a vessel wherein a process taking place in the vessel requires the absence of light.

17. A method as claimed in claim 12, wherein the initial step of placing the transceiver on the movable object includes the step of placing the transceiver on the movable object, said movable object having a characteristic length on the order of one to three centimeters.

18. A method as claimed in claim 11, wherein the step of receiving the acoustic signal includes receiving the acoustic signal with a plurality of transducers, each transducer generating a respective third signal.

19. A method as claimed in claim 11, wherein the step of transmitting an acoustic signal includes transmitting an acoustic signal in pulse mode.

20. A method as claimed in claim 11, wherein the step of transmitting an acoustic signal includes the step of transmitting an acoustic signal having a frequency of about $10^6$ hertz.

* * * * *